United States Patent [19]

Tate

[11] 4,206,058

[45] * Jun. 3, 1980

[54] METHOD FOR STIMULATING WELL PRODUCTION

[75] Inventor: Jack F. Tate, Houston, Tex.

[73] Assignee: Texaco Inc., White Plains, N.Y.

[ * ] Notice: The portion of the term of this patent subsequent to Aug. 7, 1996, has been disclaimed.

[21] Appl. No.: 877,136

[22] Filed: Feb. 13, 1978

Related U.S. Application Data

[63] Continuation-in-part of Ser. No. 752,939, Dec. 22, 1976, abandoned.

[51] Int. Cl.$^2$ .............................................. E21B 43/27
[52] U.S. Cl. ................................ 252/8.55 C; 166/307; 526/287
[58] Field of Search ...................... 252/8.55 R, 8.55 C, 252/8.55 D; 166/282, 307; 526/287

[56] References Cited

U.S. PATENT DOCUMENTS

| | | | |
|---|---|---|---|
| 2,596,137 | 5/1952 | Fast | 252/8.55 X |
| 2,763,326 | 9/1956 | Cardwell et al. | 252/8.55 X |
| 2,778,427 | 1/1957 | Cardwell et al. | 252/8.55 X |
| 3,679,000 | 7/1972 | Kaufman | 252/8.55 X |
| 3,892,720 | 7/1975 | Jahnke | 526/287 |
| 3,923,666 | 12/1975 | Dill | 252/8.55 |

*Primary Examiner*—Herbert B. Guynn
*Attorney, Agent, or Firm*—Carl G. Ries; Thomas H. Whaley; Walter D. Hunter

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein an oxyalkylated acrylamido alkanesulfonic acid polymer. The increase in the permeability and porosity of the formation achieved utilizing the method of invention results in a substantial improvement in hydrocarbon recovery.

8 Claims, No Drawings

METHOD FOR STIMULATING WELL PRODUCTION

This application is a Continuation-in-Part of application Ser. No. 752,939, filed Dec. 22, 1976, now abandoned.

FIELD OF THE INVENTION

This invention relates to a method for stimulating the production of fluids from earthen formations. More particularly, this invention relates to a method in which the permeability and porosity of a hydrocarbon-bearing formation containing acid-soluble components and with or without water-sensitive clays or shales are improved upon treatment of the formation with an aqueous solution of an oxyalkylated acrylamido alkanesulfonic acid polymer and a mineral acid.

DESCRIPTION OF THE PRIOR ART

The technique of increasing the permeability of a subterranean hydrocarbon-bearing formation for the purpose of stimulating the production of fluids therefrom has long been practiced in the art. One such method commonly employed is known as acidizing which is widely utilized in treating subsurface calcareous geological formations, e.g., limestone, dolomite, etc. In the usual well-acidizing procedure, a non-oxidizing mineral acid is introduced into the well and under sufficient pressure is forced into the adjacent subterranean formation where it reacts with acid-reactive components, magnesium carbonate, etc., to form the respective salt of the acid, carbon dioxide and water. The usual acid employed in such acidization procedures is hydrochloric acid.

During the process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed is extensively water soluble and is readily removed by reverse flow from the formation via the well bore.

There are, however, disadvantages attending the use of hydrochloric acid or other similar non-oxidizing mineral acids. For example, these strong aqueous acids have almost instantaneous rates of reaction with the carbonates contained in the formation. The acid, therefore, necessarily spends itself in the formation immediately adjacent the well bore so little beneficial effect is realized at any great distance from the well bore within the formation under treatment. These strong aqueous acids also may cause channeling, cavitation and eventual collapse of the formation immediately adjacent the well bore due to excessively rapid action of the acid. In addition, subsurface equipment may be damaged severely by strong acid attack.

One suggested solution to overcome these disadvantages has been the use of "retarded" acids which consist of a mineral acid and an additive which emulsifies the acid the combination of which affects the acidization rate. However, although such emulsified mixtures can be displaced into a formation before substantial reaction occurs, they have the inherent disadvantage that when the emulsion breaks and they do react, they usually react swiftly, often unpredictably, and without substantially resolving the problem of cavitation.

The use of cross-linked copolymers of polyvinylpyrrolidone and polyacrylamides, polyurethanes, etc. to give materials which are insoluble in aqueous mineral acid solutions is described in U.S. Pat. No. 3,380,529 to Hendrickson. Such insoluble, cross-linked polymers are utilized as agents for partially plugging channels developed during acidization treatment in order to effect acidic attack at greater distances from the well bore. In U.S. Pat. No. 3,434,971 a similar acidization process is described in which a copolymer prepared by polymerizing acrylamide and N-vinylpyrrolidone in the presence of a cross-linking agent, such as N,N'-methylene-bis-acrylamide, is disclosed. These copolymers are insoluble in the aqueous mineral acid solutions employed in acidization operations and are utilized as dispersions in the acid solutions. Both of the previously mentioned acidization processes which utilize insoluble, cross-linked copolymers are distinctly different from the novel method of this invention in which an acrylamido alkanesulfonic acid polymer soluble in aqueous mineral acid solutions is used.

It is therefore, the principal object of the present invention to overcome the defects of the prior art in acidizing fluid bearing formations such as hydrocarbon-bearing formations, etc., by providing a method utilizing the novel acidizing composition of this invention in which the distance to which the acidizing composition penetrates the formations before becoming spent is extended, thus providing in-depth acidization.

Another object of this invention is to provide a high viscosity acidizing fluid containing in solution an oxyalkylated acrylamido alkanesulfonic acid polymer which is stable over long periods of time in which the polymer constituent does not hydrolyze or otherwise decompose on storage thus avoiding the simultaneous reduction in viscosity and effectiveness in acidization-in-depth operations.

SUMMARY OF THE INVENTION

This invention encompasses and includes a method of increasing the production of fluids from a subterranean fluid-bearing formation having present acid-soluble components and with or without water-sensitive clays or shales, comprising injecting down the well bore penetrating said formation and injecting therefrom into said formation under a pressure greater than formation pressure an aqueous acidizing composition, maintaining said composition in contact with the formation strata for a time sufficient for the acid to chemically react with the acid-soluble components of the formation to etch or enlarge passageways therethrough thereby increasing substantially the flow capacity of the said subterranean formation.

The novel acidizing composition of this invention comprises an aqueous solution of a mineral acid, selected from the group consisting of hydrochloric and sulfuric acid, having dissolved therein an oxyalkylated acrylamido alkanesulfonic acid polymer or copolymer thereof. The amount of acid present in the subject composition is such that it is capable of reacting with acid-soluble components of the fluid-bearing strata.

A number of advantages result in employing the novel composition of this invention in acidizing calcareous fluid-bearing formations, namely:

(1) The reaction rate of the acid with the formation acid-solubles, such as carbonates, dolomites, etc., is greatly lessened. One of the most serious problems encountered in the use of mineral acids as acidizing agents is the very rapid rate with which the known acidizing compositions react with such acid-solubles so that little actual effect takes place at any great distance from the well.

(2) The post-precipitation of dissolved carbonates is prevented. Because of the nature of the dissolution reaction:

$$Ca(HCO_3)_2 \rightleftharpoons CaCO_3 + H_2O + CO_2 \uparrow$$

when pressure is released so that spent reaction products from the acidization process can flow back out or be pumped out, carbon dioxide gas can break out of solution, causing post-precipitation of calcium carbonate. Such post-precipitation occurring within the formation matrix near the bore hole can decrease permeability by plugging capillaries and result in a lower production rate. Maintenance of a low pH due to the presence of unspent acid prevents the post precipitation of carbonates.

(3) The viscosity of the acidizing fluid is increased. Such a viscosity increase is characteristic of fluid-loss agents often used in acidizing formulations to cause more uniform formation penetration and minimize vertical leakage. This is especially important in stimulations wherein fracturing is desired since leakage lessens the extent of fracture propagation.

DETAILED DESCRIPTION OF THE INVENTION

In its broadest embodiment the method of the present invention comprises introducing into a subsurface calcareous formation an acid solution of a water-soluble, oxyalkylated acrylamido alkanesulfonic acid polymer wherein the said solution is maintained in contact with the formation for a time sufficient to chemically react with the formation so as to increase substantially the flow capabilities of the formation and to release carbon dioxide concomitantly whereby a beneficial effect due to the mutual miscibility of carbon dioxide in the fluid phase is realized as a reduction in viscosity and retentive capillary forces, while another beneficial effect is realized in the form of increased formation energy, due to the pressure generated by the released carbon dioxide.

The average molecular weight of the oxyalkylated acrylamido alkanesulfonic acid polymers and copolymers utilized in the method of this invention generally will be from about 1,000 to about 1,000,000 or more and preferably will be from about 1,000 to about 400,000.

Highly advantageous results are realized with the method of this invention when the water-soluble oxyalkylated acrylamido alkanesulfonic acid polymer employed comprises recurring units of the formula:

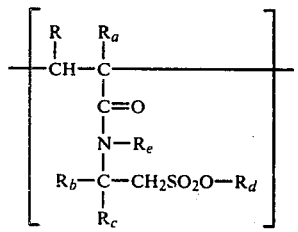

wherein R, $R_a$, $R_b$, and $R_c$ are independently selected from the grou consisting of hydrogen and alkyl having from 1 to 5 inclusive carbon atoms, $R_d$ is selected from the group consisting of hydrogen and —($C_3H_6O$)$_n$—($C_2H_4O$)$_m$M, wheerein n is an integer of from 0 to about 5, m is an integer of from 3 to about 20 and M is selected from the group consisting of hydrogen, sodium, potassium and ammonium and $R_e$ is selected from the group consisting of hydrogen and —($C_3H_6O$)$_r$—($C_2H_4O$)$_s$M wherein r is an integer of 0 to about 5, and s is an integer of from 3 to about 20 and with the proviso that when $R_d$ is hydrogen then $R_e$ is —($C_3H_6O$)$_r$—($C_2H_4O$)$_s$ M and when $R_e$ is hydrogen, then $R_d$ is —($C_3H_6O$)$_n$—($C_2H_4O$)$_m$M.

Preferably, the acidic polymer solution of this invention is one comprising an aqueous solution of about 2 to about 30 percent by weight of a mineral acid selected from the group consisting of hydrochloric or sulfuric acid which may or may not include brine, and which contains dissolved therein between about 0.1 to about 10 percent by weight based on the total solution weight of a water-soluble, oxyalkylated acrylamido alkanesulfonic acid polymer or copolymer.

Generally, the acidic polymer solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al in U.S. Pat. No. 1,877,504 or a rosin amine type as described in U.S. Pat. No. 2,758,970. The amount of the inhibitor utilized is not highly critical and it may be varied widely. Usually this amount is defined as a small but effective amount, e.g., from 0.02 percent to about 2.0 percent by weight or more of the acidic polymer solution.

The oxyalkylated acrylamido alkanesulfonic acid polymers employed show a high degree of compatibility (i.e., no reaction) with inorganic salt solutions of compounds such as magnesium chloride, calcium chloride, barium chloride, sodium chloride, etc. As expected, the intrinsic viscosity increases with concentration and molecular weight (degree of polymerization). One of the unique characteristics of the cited polymer lies in the large increase in viscosity in aqueous acidic solution thereof as the acidity is increased.

The oxyalkylated acrylamido alkanesulfonic acid compounds utilized in preparing the polymers and copolymers employed in the novel treating compositions of this invention can be prepared by methods well known in the art. For example, the alkylene oxide can be reacted with the acrylamido alkanesulfonic acid dissolved in a suitable solvent throughout which an alkaline catalyst, such as potassium hydroxide or sodium hydroxide, is uniformly dispersed. The quantity of the catalyst utilized generally will be from about 0.15 to about 1.0 percent by weight of the reactants. Preferably, the reaction temperature will range from about 80° C. to about 180° C. while the reaction time will be from about 1 to about 20 hours or more depending on the particular reaction conditions employed. This process is more completely described in U.S. Pat. No. 2,425,845.

Oxyalkylated acrylamido alkanesulfonic acid compounds containing block polypropylene and polyethylene groups can be prepared by well-known methods such as taught, for example, in U.S. Pat. Nos. 3,062,747; 2,174,761 or in 2,425,755. In general, the acrylamido alkanesulfonic acid initiator procedure consists in condensing with propylene oxide in the presence of an oxyalkylation catalyst until the required amount of the oxide has reacted then continuing the oxyalkylation reaction with the ethylene oxide until the desired block oxyalkylated polymer is formed.

The oxyalkylated acrylamido alkanesulfonic acid monomers can be homopolymerized, for example, in distilled water at 30° to 95° C. in 2 to 5 days or more and the reaction rate and extent of polymerization can be considerably increased by the addition of catalysts such as ferrous sulfate, heptahydrate, hydrogen peroxide, etc.

Copolymers useful in the novel treating compositions are prepared by copolymerizing (A) an oxyalkylated acrylamido alkanesulfonic acid of the formula:

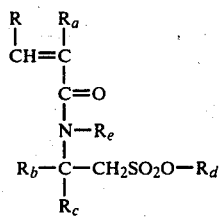

wherein R, $R_a$, $R_b$, $R_c$, $R_d$ and $R_e$ have the same meaning as described above and (B) acrylamide acrylic acid, acrylonitrile, maleic anhydride, N-vinylpyrrolidone, hydroxyethyl and acrylate and butoxyethyl acrylate, etc. Generally about 60 to about 90 percent by weight of the copolymer will comprise recurring units derived from (A) above. The useful copolymers may be prepared by a variety of polymerization techniques well known in the art such as solution copolymerization, slurry copolymerization, etc. utilizing a wide variety of catalysts such as sodium lauryl sulfate, sodium metabisulfite, ammonium persulfate, azo-bis-isobutyronitrile, ferrous sulfate heptahydrate, hydrogen peroxide, etc.

In carrying out the method of this invention a solution of from about 3 to about 30% by weight of the non-oxidizing mineral acid dissolved in water is first prepared. An inhibitor to prevent corrosion of acid on the metal equipment associated with the well is usually added with mixing in the next step. The polymer in an amount within the stated concentration range is then admixed with the aqueous acid solution employing a blender. The polymer dissolves rather rapidly in the acid solution and the thus-prepared composition is forced, usually via a suitable pumping system, down the well bore and into contact with the formation to be treated. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acidic polymer solution to remain in contact with the formation until the acid therein has been substantially depleted by reaction with the acid-soluble components of the formation. After this, the substantially spent treating solution is reversed out of the well, i.e., it is allowed to flow back out or to be pumped out of the formation. Further, as those skilled in the art will understand, the concentration of the polymer and acid should be chosen to provide an acidizing fluid of the desired rheological properties. Similarly, the appropriate molecular weight polymer is selected on this same basis.

The following example illustrates one embodiment of this invention and is to be considered not limitative.

EXAMPLE I

A well drilled in a tight limestone formation is treated with an aqueous acidic polymer composition of this invention in order to stimulate oil production. In preparing to treat the producing formation of the well a packer is set above perforations located in the interval 6,725–40 feet. A solution of 1% by weight of a polymer having a molecular weight of about 72,000 and consisting essentially of recurring units of the formula:

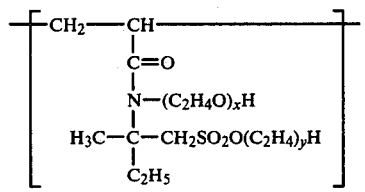

wherein the sum of $x+y$ is about 7, is prepared by dissolving completely 500 pounds of the polymer in 6,000 gallons of 15% by weight hydrochloric acid using cyclic turbulent circulation. A conventional corrosion inhibitor and nonemulsifying agent are present in the acid.

In the first part of the stimulation operation, a pad of 3,000 gallons of lease water containing 25 gallons of a scale inhibitor initially to prevent post-precipitation of carbonates is dissolved in the subsequent acidizing process and is pumped into the formation. In the next step, 1,500 gallons of conventional 15% HCl is pumped into the formation to remove scale in the vicinity of the well bore. In the third step, 4,500 gallons of the acidizing mixture previously described is pumped into the formation. Finally, the aqueous acidic polymer solution was displaced into the formation by pumping an additional 15,000 gallons of lease water into it. The well is then shut in 10 hours after treatment and at the end of that time the production is measured and found to be substantially in excess of production prior to the acidization treatment.

What is claimed is:

1. A method of increasing the production of fluids from a subterranean fluid-bearing formation having present therein acid-soluble components and, optionally, water-sensitive shales or clays comprising injecting down the well bore penetrating said formation and injecting therefrom into said formation under a pressure greater than the formation pressure, an acidic aqueous polymer solution comprising about 0.1 to about 10 percent by weight based on the total solution weight of an oxyalkylated acrylamido alkanesulfonic acid polymer dissolved in a mineral acid selected from the group consisting of hydrochloric, sulfuric acid and mixtures thereof, maintaining said composition in contact with the formation for a time sufficient for the acid to chemically react with the acid-soluble components of the formation to etch passageways therethrough thereby increasing substantially the flow capacity of the said subterranean formation and wherein the said oxyalkylated acrylamido alkanesulfonic acid polymer comprises recurring units of the formula:

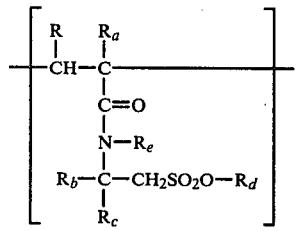

wherein R, $R_a$, $R_b$ and $R_c$ are independently selected from the group consisting of hydrogen and alkyl having from 1 to 5 inclusive carbon atoms, $R_d$ is selected from the group consisting of hydrogen and $-(C_3H_6O)_n-(C_2H_4O)_mM$, wherein n is an integer of from 0 to about 5, m is an integer of from 3 to about 20 and M is selected from the group consisting of hydrogen, sodium, potassium and ammonium and $R_e$ is selected from the group consisting of hydrogen and $-(C_3H_6O)_r-(C_2H_4O)_sM$, wherein r is an integer of from 0 to about 5 and wherein s is an integer of from 3 to about 20 and with the proviso that when $R_d$ is hydrogen, then $R_e$ is $-(C_3H_6O)_r-(C_2H_4O)_sM$ and when $R_e$ is hydrogen, then $R_d$ is $-(C_3H_6O)_r-(C_2H_4O)_sM$ and wherein the average molecular weight of the polymer ranges from about 1000 to about 1,000,000.

2. The method of claim 1, wherein the said formation is a hydrocarbon-bearing formation.

3. The method of claim 1, wherein the said composition of claim 1 is injected down the well bore penetrating said formation under a pressure greater than the formation pressure and sufficient to create fractures in the formation.

4. The method of claim 1, wherein the said composition of claim 1 is injected down the well bore penetrating said formation under a pressure greater than the formation pressure but less than the pressure required to create fractures in the formation.

5. The method of claim 1 wherein the said mineral acid is hydrochloric acid.

6. The method of claim 1 wherein said mineral acid is about 2 to about 30% by weight hydrochloric acid.

7. A method of increasing the production of fluids from a subterranean fluid-bearing formation having present therein acid-soluble components and, optionally, water-sensitive shales or clays comprising injecting down the well bore penetrating said formation and injecting therefrom into said formation under a pressure greater than the formation pressure, an acidic aqueous polymer solution comprising about 0.1 to about 10 percent by weight based on the total solution weight of an oxyalkylated acrylamido alkanesulfonic acid polymer dissolved in a mineral acid selected from the group consisting of hydrochloric, sulfuric acid and mixtures thereof, maintaining said composition in contact with the formation for a time sufficient for the acid to chemically react with the acid-soluble components of the formation to etch passageways therethrough thereby increasing substantially the flow capacity of the said subterranean formation and wherein the said oxyalkylated acrylamido alkanesulfonic acid polymer is a water-soluble copolymer of (A) a compound of the formula:

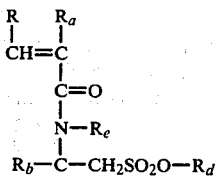

wherein R, $R_a$, $R_b$ and $R_c$ are independently selected from the group consisting of hydrogen and alkyl having from 1 to 5 inclusive carbon atoms, $R_d$ is selected from the group consisting of hydrogen and $-(C_3H_6O)_n-(C_2H_4O)_mM$, wherein n is an integer of from 0 to about 5, m is an integer of from 3 to about 20 and M is selected from the group consisting of hydrogen, sodium, potassium and ammonium and $R_e$ is selected from the group consisting of hydrogen and $-(C_3H_6O)_r-(C_2H_4O)_sM$, wherein r is an integer of from 0 to about 5 and wherein s is an integer of from 3 to about 20 and with the proviso that when $R_d$ is hydrogen, then $R_e$ is $-(C_3H_6O)_r-(C_2H_4O)_sM$ and when $R_e$ is hydrogen, then $R_d$ is $-(C_3H_6O)_r-(C_2H_4O)_sM$ and (B) a monomer selected from the group consisting of acrylamide, acrylic acid, acrylonitrile, maleic anhydride, N-vinylpyrrolidone, hydroxyethyl acrylate and butoxyethyl acrylate and wherein about 60 to about 90 percent by weight of the said copolymer is derived from compound (A) and wherein the average molecular weight of the copolymer ranges from about 1000 to about 1,000,000.

8. An aqueous solution of about 2 to about 30 percent by weight of a mineral acid selected from the group consisting of hydrochloric acid and sulfuric acid which contains dissolved therein about 0.1 to about 10 percent by weight based on the total solution weight of an oxyalkylated acrylamido alkanesulfonic acid polymer and wherein the said oxyalkylated acrylamido alkanesulfonic acid polymer comprises recurring units of the formula:

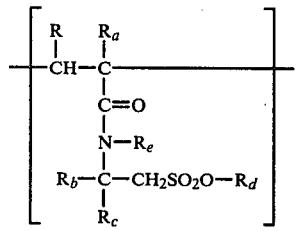

wherein R, $R_a$, $R_b$ and $R_c$ are independently selected from the group consisting of hydrogen and alkyl having from 1 to 5 inclusive carbon atoms, $R_d$ is selected from the group consisting of hydrogen and $-(C_3H_6O)_n-(C_2H_4O)_mM$, wherein n is an integer of from 0 to about 5, m is an integer of from 3 to about 20 and M is selected from the group consisting of hydrogen, sodium, potassium and ammonium and $R_e$ is selected from the group consisting of hydrogen and $-(C_3H_6O)_r-(C_2H_4O)_sM$, wherein r is an integer of 0 to about 5 and wherein s is an integer of from 3 to about 20 and with the proviso that when $R_d$ is hydrogen, then $R_e$ is $-(C_3H_6O)_r-(C_2H_4O)_sM$ and when $R_e$ is hydrogen, then $R_d$ is $-(C_3H_6O)_r-(C_2H_4O)_sM$ and wherein the average molecular weight of the polymer ranges from about 1000 to about 1,000,000.

* * * * *

UNITED STATES PATENT AND TRADEMARK OFFICE
CERTIFICATE OF CORRECTION

PATENT NO. : 4,206,058
DATED : January 3, 1980
INVENTOR(S) : Jack T. Tate

It is certified that error appears in the above-identified patent and that said Letters Patent is hereby corrected as shown below:

Claim 7, Col. 8, Line 8 delete

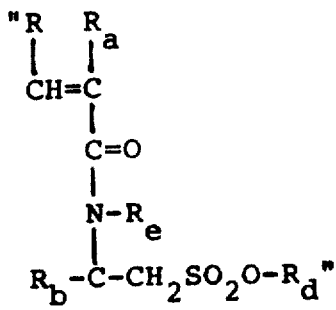

UNITED STATES PATENT AND TRADEMARK OFFICE
CERTIFICATE OF CORRECTION

PATENT NO. : 4,206,058

DATED : January 3, 1980

INVENTOR(S) : Jack T. Tate

It is certified that error appears in the above-identified patent and that said Letters Patent is hereby corrected as shown below:

and substitute therefor

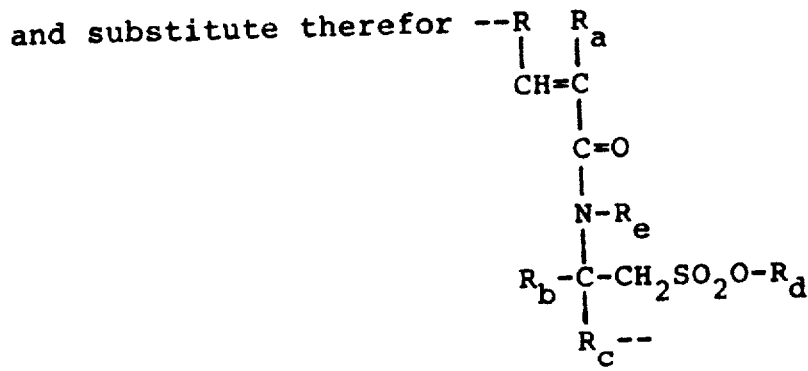

Signed and Sealed this

Second Day of October 1984

[SEAL]

Attest:

Attesting Officer

GERALD J. MOSSINGHOFF

Commissioner of Patents and Trademarks